(12) United States Patent  
Keys

(10) Patent No.: US 7,931,194 B2  
(45) Date of Patent: Apr. 26, 2011

(54) METHODS AND APPARATUS FOR AUTOMATED DOCUMENT EXAMINATION FOR AGE VERIFICATION

(75) Inventor: John B. Keys, Duluth, GA (US)

(73) Assignee: NCR Corporation, Duluth, GA (US)

( * ) Notice: Subject to any disclaimer, the term of this patent is extended or adjusted under 35 U.S.C. 154(b) by 766 days.

(21) Appl. No.: 11/314,603

(22) Filed: Dec. 21, 2005

(65) Prior Publication Data

US 2007/0138260 A1  Jun. 21, 2007

(51) Int. Cl.
*G06K 5/00* (2006.01)
(52) U.S. Cl. .......................... 235/380; 235/382; 235/379
(58) Field of Classification Search ............ 235/382, 235/382.5, 375, 379, 384, 380
See application file for complete search history.

(56) References Cited

U.S. PATENT DOCUMENTS

2001/0018660 A1 * 8/2001 Sehr .................................. 705/5
2004/0049427 A1 * 3/2004 Tami et al. ...................... 705/24

* cited by examiner

*Primary Examiner* — Karl D. Frech
(74) *Attorney, Agent, or Firm* — Harden E. Stevens, III; Peter Priest

(57) ABSTRACT

Systems and techniques for automated age verification in self service transaction processing. Upon identification of an age restricted product presented for purchase, presentation of a purchaser identification document is requested. Encoded information is read from the document and a purchaser photograph obtained from the document is examined. An image of the purchaser is also captured. The purchaser birth date encoded on the document is evaluated and the captured image of the purchaser is compared with the image of the purchaser photograph. The purchase is authorized if the purchaser birth date indicates that the purchaser meets the age requirements for the purchase and the captured purchaser image matches the photograph.

17 Claims, 5 Drawing Sheets

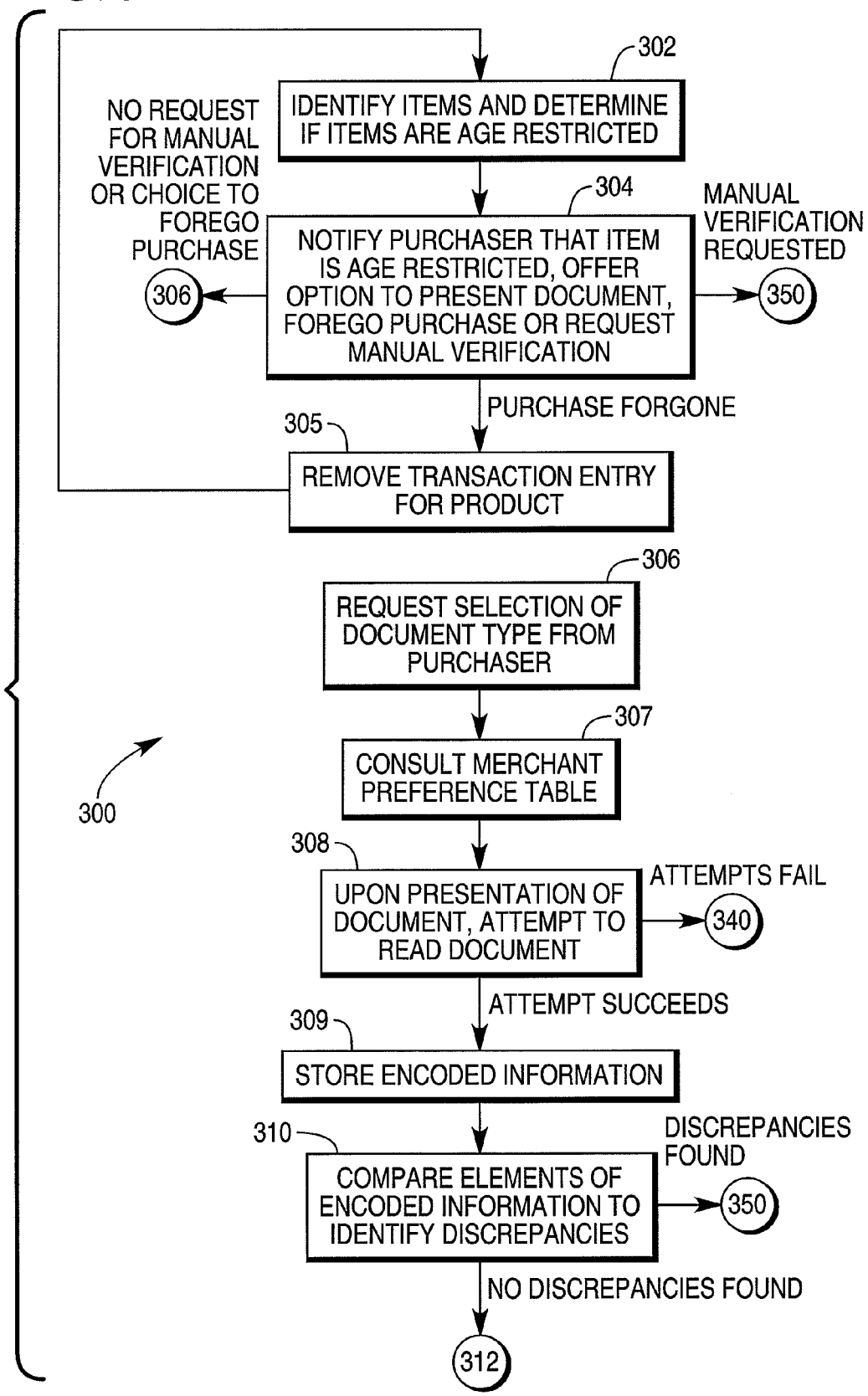

METHODS AND APPARATUS FOR AUTOMATED DOCUMENT EXAMINATION FOR AGE VERIFICATION

FIELD OF THE INVENTION

The present invention relates generally to improvements to retail customer self checkout systems. More particularly, the invention relates to improved systems and techniques for automated document examination to verify customer age for age restricted purchases.

BACKGROUND OF THE INVENTION

Customer self checkout systems are gaining in use among retailers. Such systems allow for a savings of labor costs by allowing customers to manage processing of transactions with little or no manual intervention by an employee of a retailer. A typical self checkout console allows a customer to enter items into a transaction, bag the items as they are entered, and tender payment at the conclusion of the transaction, all without intervention by an employee unless special assistance is needed. One frequently encountered obstacle to complete self service checkout is the purchase of age restricted merchandise, such as alcohol or tobacco products. The mechanisms for prevention of sales of age restricted products to minors are strictly prescribed, and typically require verification of documents bearing proof of age, or verification by a retailer employee that the purchaser meets the age requirements. Typical prior art self checkout consoles depend on manual intervention in order to perform age verification. One significant obstacle to automatic age verification includes the possibility of forgery or alteration of identification documents. Another obstacle includes the possibility of submission of an identification document that has been issued to someone other than the purchaser and is used by the purchaser to deceive the retailer into improperly selling merchandise to the purchaser.

SUMMARY OF THE INVENTION

Among its several aspects, the present invention addresses such difficulties by providing for automated mechanisms for reading encoded personal information printed on or embedded in an identification document and verifying authentication and tamper resistant features on the document. A self checkout console includes a document receptacle in which a document may be placed for verification. Appropriate data processing elements within the console interpret the encoded information, suitably referring to encoding keys and other information supplied by issuing authorities. The purchaser's date of birth, or other age verification information, is extracted from the encoded information.

The processing elements also suitably examine authentication indicia on the document in order to verify that the document has not been tampered with. The console uses an image capture element, such as a digital camera, to capture an image of the purchaser. Similarly, an image is captured of the purchaser's photograph on the identification document. Facial recognition techniques are used to compare the captured image of the purchaser and the purchaser's photograph on the identification document. If the examination of age verification information indicates that the purchaser meets the age requirements for the purchase, the examination of authentication features of the document indicates that no tampering has occurred, and the facial recognition comparison indicates a match between the purchaser's image and the identification document photograph, the purchase is allowed to proceed. If any element of the analysis indicates a discrepancy, a retailer employee is alerted to allow or deny the purchase.

A more complete understanding of the present invention, as well as further features and advantages of the invention, will be apparent from the following Detailed Description and the accompanying drawings.

BRIEF DESCRIPTION OF THE DRAWINGS

FIGS. 3A-3C illustrate a process of customer checkout using automated age verification according to an aspect of the present invention.

DETAILED DESCRIPTION

Figure 1:
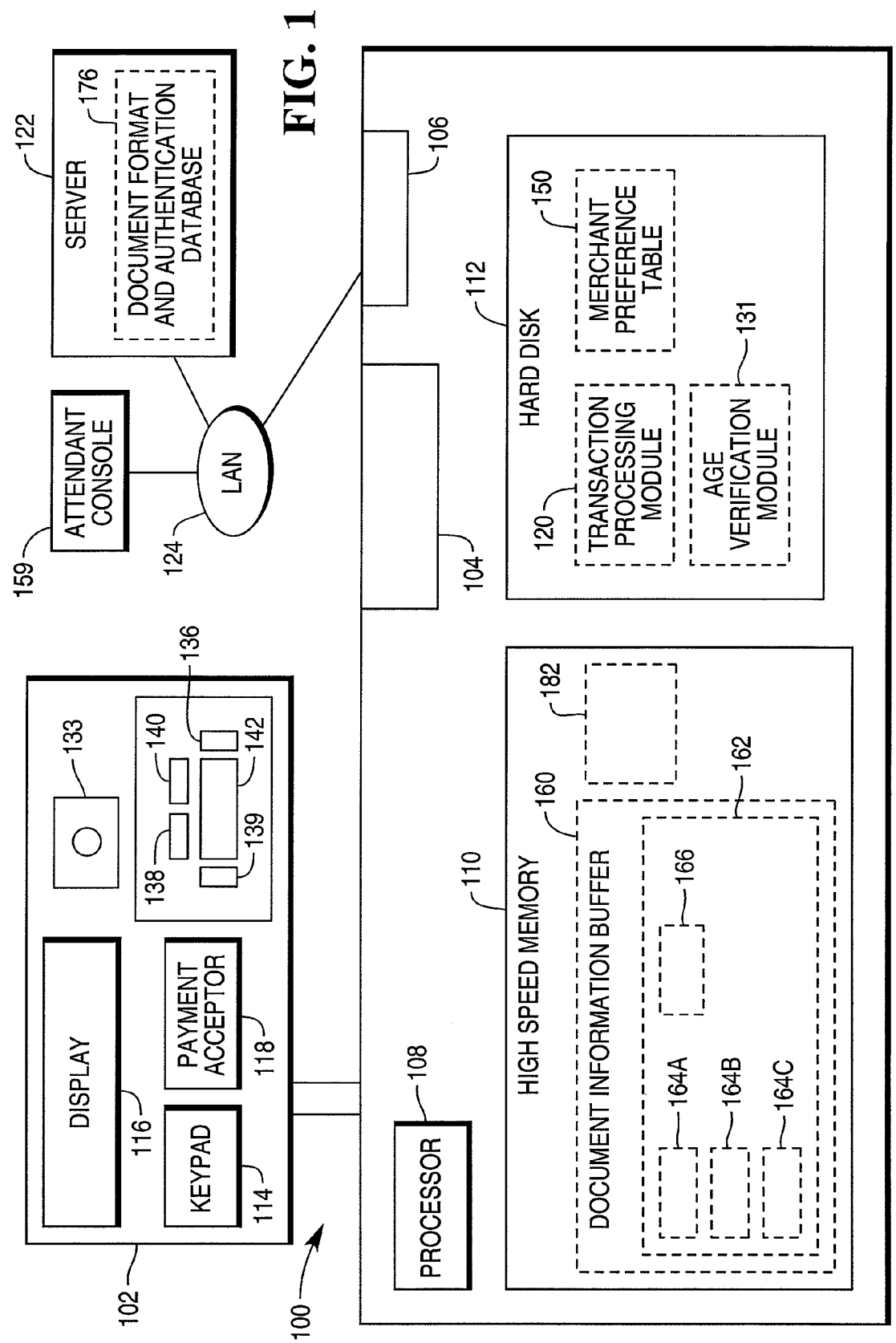
FIG. 1 illustrates a checkout station according to an aspect of the present invention.

FIG. 1 illustrates a checkout station 100 according to an aspect of the present invention. The checkout station 100 includes a user interface 102, a scanner 104, and a remote interface 106. The checkout station 100 employs data processing elements including a processor 108, high speed memory 110 and long term storage such as a hard disk 112. The user interface 102 includes a keypad 114, a display 116 and a payment acceptor 118, allowing a customer to tender payment by one or more of various means such as cash, a check, or a credit card, debit card or gift card.

The checkout station 100 employs a transaction processing module 120, suitably implemented as software hosted on the hard disk 112 and transferred to high speed memory 110 as needed for execution by the processor 108. The transaction processing module 120 receives user inputs and product information, such as bar code, product weight, and price lookup information in order to carry out transactions. The transaction processing module 120 may retrieve information, such as product identification and price information, hosted on a remote device, such as the server 122. The checkout station 100 suitably communicates with the server 122 through a local area network (LAN) 124. The transaction processing module 120 may also direct the sending and receiving of financial information, such as credit and debit card authorization and check verification, through a remote device such as the server 122.

The user interface 102 further includes elements used to collect data to be used in verifying the age of a purchaser, and the transaction processing module 120 includes components for processing and acting on this data. The user interface 102 includes an identification document reader 132 and an image capture device such as a digital camera 133. When an age restricted product is to be purchased, the identification document reader 132 accepts and collects information from documents submitted by the purchaser and the digital camera 133 provides the ability to capture a purchaser image.

The transaction processing module 120 retrieves identification information for each product as it is submitted for purchase. When an age restricted product is identified, for example, by retrieving identification information associated with a bar code, the transaction processing module 130 invokes an age verification module 131. The age verification module 131 requests, suitably by directing display of a suitable message on the display 116, that the purchaser submit an identification document by placing the document into the reader 132.

When the purchaser places the document into the document reader 132, the document reader 132 reads encoded information on the document. Suitably, the document reader 132 includes a magnetic strip reader 136, an optical reader 138, a smart card reader 139 and an image capture device 140. The reader 132 is suitably constructed so that each information gathering device is able to operate on the document after the document is placed in the document reader 132. For example, the magnetic strip reader 136 may read a magnetic strip if the document has one, as the document is inserted into the document reader 132. The document is then transported into a receptacle 142. Once in the receptacle 142, the document may be scanned by the optical reader 138 to identify and decode any optically encoded information. Optical encoding of information on driver's licenses issued in the United States is commonly accomplished through the use of a PDF417 standard bar code, which is commonly used to encode information on driver's licenses and state validity information as well as personal information relating to the holder, including name, address, document issue and expiration, birth date and other information. Preferably, the optical reader 136 is able to scan numerous different bar code types, in order to accommodate different standards used by different jurisdictions for encoding of driver license and state identification card information, and to accommodate different types of identification documents, such as military identification cards, immigration documents or the like.

The document may also be scanned by the smart card reader 139, which identifies and reads a smart card chip, if such a chip is present. In addition, the image capture device 140 is able to capture an image of the document in order to allow processing of a photograph of the document holder presented on the document.

The age verification module 131 suitably consults a record of merchant preferences in directing the operation of the various elements of the document reader 132 and collecting and processing information collected from a submitted document. The record of merchant preferences is illustrated here as stored in a merchant preference table 150, hosted on the hard disk 112. It will be recognized, however, that such a record may be stored in a remote location, such as the server 122. It will further be recognized that such a record is optional, used to increase convenience of operation, and that in the absence of such a record, the age verification module 131 may simply operate in a standardized way.

The merchant preference table 150 suitably stores document format information for documents that are likely to be submitted and is used by the age verification module 131 to identify information formats present in the documents most likely to be submitted. The knowledge of likely information formats is used in selecting elements of the document reader 132 that are to be used to examine a submitted document and is also used in processing the information collected by the document reader 132. For example, the most likely document to be submitted for age verification is a driver's license issued by the state in which the merchant is operating. The merchant preference table may suitably include a preference entry identifying the state's driver's license as the primary document, and identifying the format of the document. For example, the preference entry may specify that the document includes information encoded in the PDF417 format, and may specify the elements of information to be collected. The preference table may specify other likely documents and include entries for these documents. For example, an entry for a state issued identification card may be present, as well as a military identification card, a permanent resident alien identification card, and other documents. One example of an alternative document might be an identification card issued by a retailer to frequent customers. Such a card might be issued to a customer upon presentation and verification of a government issued identification card, and might include information copied from the government issued card, as well as identification and authentication features created by the retailer, such as a document number associated with the card, and tamper resistant features. The card might include a visible or stored customer photograph, taken by a retailer employee under conditions conducive to creating a high quality photograph amenable to automated analysis. Such a document would, if properly designed, include sufficient indicia of authentication and resistance to tampering to make it an acceptable verification of age, while including features designed to make automated verification easier than might be possible with a government issued card which was not designed with use for automated age verification in mind.

When a document is submitted, the age verification module 131 may suitably direct display of a selection screen asking the purchaser to identify a document type to which the submitted document belongs. For example, the display 116 may be implemented as a touch screen display and may present a selection of commonly used documents, such as a driver's license for the state in which the checkout station 100 is being used, a state identification card for that state, a retailer issued identification card if such a card is issued and can be used for age verification, or any selection desired. If the purchaser makes a selection, formatting and other specifications associated with the selected document type are used. Alternatively, if the station 100 is not designed so as to present a selection to the purchaser or if such a selection is presented by the purchaser elects not to make a selection or if the document type submitted by the purchaser is not among those presented on the selection screen, the age verification module 131 suitably consults the merchant preference table 150 and first attempts to read the document as a document specified in the table as the most likely document, and to process the document information according to specifications associated with such a document. If such a reading fails, an attempt is made to read the document as the second most likely document, and so on. If all such readings fail, the age verification module 131 directs a comprehensive examination, in which each of the information gathering elements in the document reader 132 is used to gather encoded information. If the document still cannot be read, a message is presented to the purchaser requesting that the purchaser check positioning of the document. A specified number of repeated attempts to read the document are made, unless the purchaser indicates that he or she does not wish to present the document again. If all attempts to read the document fail, an attendant is summoned, preferably by displaying a suitable message or sending an audible tone or verbal request to an attendant console 159. In addition, at any point during the process, the purchaser may summon an attendant by making a suitable entry using the keypad 114.

All encoded information gathered from the document is assembled and stored in a document information buffer 160 in the high speed memory 110. The document information buffer 160 stores a document information record 162. The document information record includes document information elements 164A-164C, for document information collected from each of the readers 136, 138 and 139, respectively, as well as a document image 166, representing the document image captured by the image capture device 140.

If document information has been collected for one or more of the readers 136, 138 and 139, the document information element corresponding to that reader is populated with the information collected by the corresponding reader. For any element, the information may include one or more of the document number, identity of the jurisdiction issuing the document, name address and birth date of the document holder and other elements of information. If document information elements associated with each reader include a notation that no information was collected by that reader.

Once the document information has been stored, the age verification module 131 examines the information stored in each document information zone in order to verify the information and confirm that the purchaser meets the age requirements for the product to be purchased. The age verification module examines the document information elements 164A, 164B and 164C to identify the document format and identity and the jurisdiction issuing the document, and checks this information against information for known documents stored in a document format and authentication database 176, suitably stored on the server 122 and retrieved or consulted when needed. If the document was not found in the database, or if the document fails to meet formatting requirements, automatic age authentication is rejected and an attendant is summoned, suitably by sending an alert to the attendant console 159.

If the document meets formatting and authentication requirements, the verification module 131 suitably compares information in the document information elements 164A, 164B and 164C. If two or more document information zones are populated with information and any element in one zone fails to match a corresponding element in another zone, automatic age verification is rejected and an attendant is summoned, suitably by displaying an appropriate message on the attendant console 159. Next, the birth date information entry for one of the document information zones is examined and evaluated to determine whether the purchaser meets age requirements. If the purchaser does not meet age requirements, automatic age evaluation fails and an attendant is summoned. If the purchaser appears to meet age requirements, the age verification module 131 directs display of a message or presentation of an audible message instructing or directing the purchaser to position himself or herself for photographing. A photograph of the purchaser is captured with the digital camera 133. A purchaser image 182 is then captured and stored. The age verification module 131 performs image processing on the document image 166 and the purchaser image 182. The document image 166 is examined to isolate the document holder photograph. Suitably, document format information stored in the merchant preference table 150 or the document format and authentication database 176 may be consulted to assist in isolating the document holder photograph. The document holder photograph and the purchaser image 182 are processed and compared using facial recognition techniques. If the document holder photograph matches the captured image of the purchaser, age verification passes and the purchaser is allowed to buy the presented product, and all other products presented in the transaction for which the customer meets the age requirements. If the document holder photograph does not match the captured image of the purchaser, automatic age verification fails and an attendant is summoned.

Figure 2A:
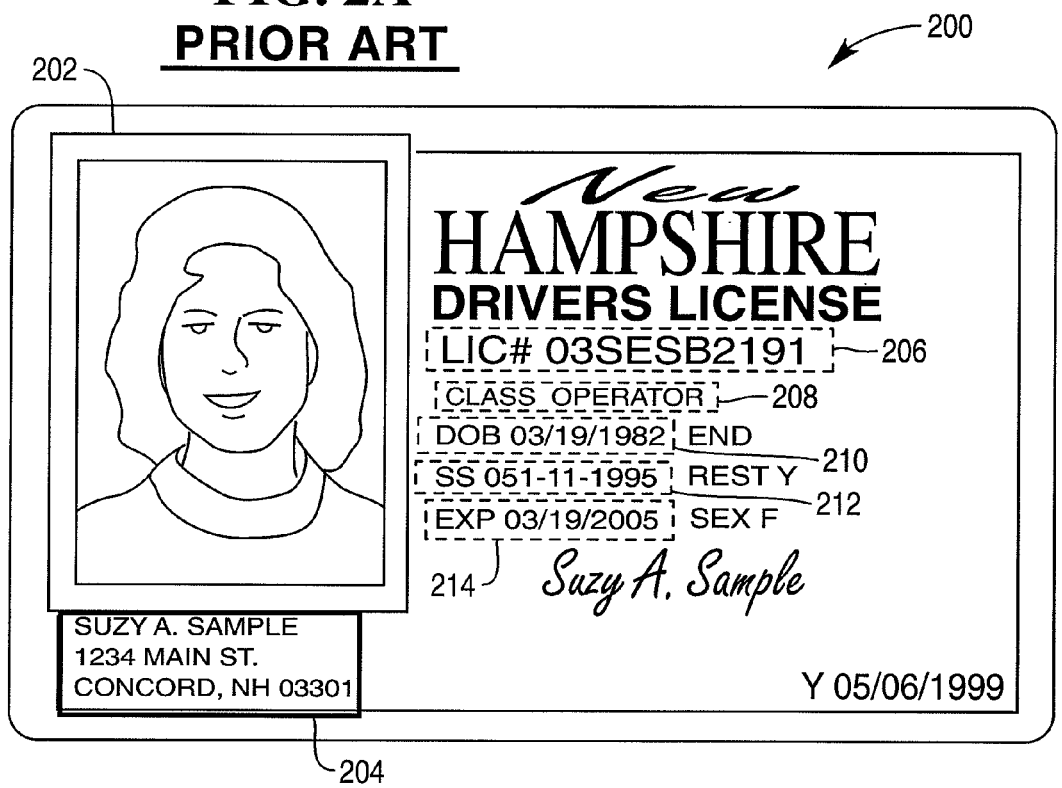
FIGS. 2A and 2B illustrate views of a sample driver's license bearing encoded information readable by a checkout station according to an aspect of the present invention.
Figure 2B:
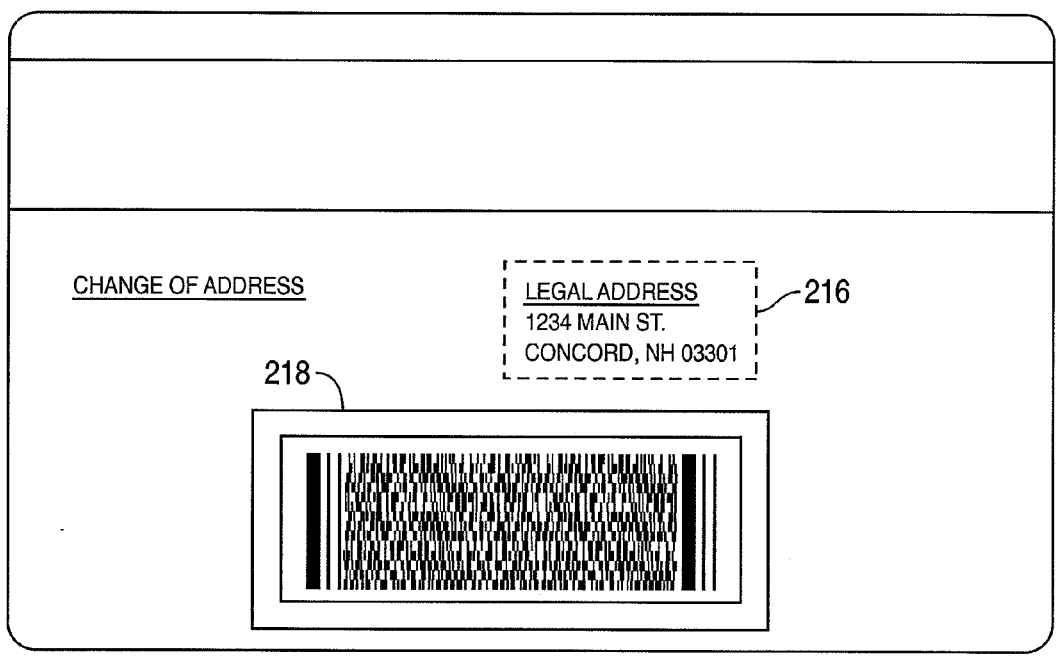

FIGS. 2A and 2B illustrate views of a sample driver's license 200, bearing information encoded using the PDF417 standard. The driver's license 200 and the encoding techniques used are prior art, but provide an example of data that can be used by equipment and techniques designed and used according to the present invention. FIG. 2A illustrates a front view of the license 200, showing a photograph 202, an address field 204 and various additional information fields 206-214. These fields are readable by a human viewing the license 200.

FIG. 2B illustrates a rear view of the license, showing an additional field 216, providing an additional instance of the holder's address, and a bar code 218, encoding using the PDF417 standard. The bar code 218 can be read by any suitably equipped reader, and includes the following encoded information:
ANSI6360390101DL00290161DLDAQ03SES82191DAA-SAMPLE, SUSY, ADAG1234MAIN STDAICONCORD-DAJNHDAK03301 DAR DASY DAT DBA20030319 DBB19820319 DBCFDBD1990611 DAU503

The various elements beginning with the letter "D," such as DAQ, DAA, DAG, DAK, and the like, are separators introducing and defining each data element according to rules specified in the PDF417 standard. For example, the separator DAQ introduces the holder's driver's license number and the separator DBB introduces the holder's date of birth. If the document 200 is used in the checkout station 100, the various elements of information provided in the bar code 218 may be extracted and stored in appropriate locations in the document information buffer, 160, from which they are retrieved as needed for examination and evaluation.

Figure 3B:
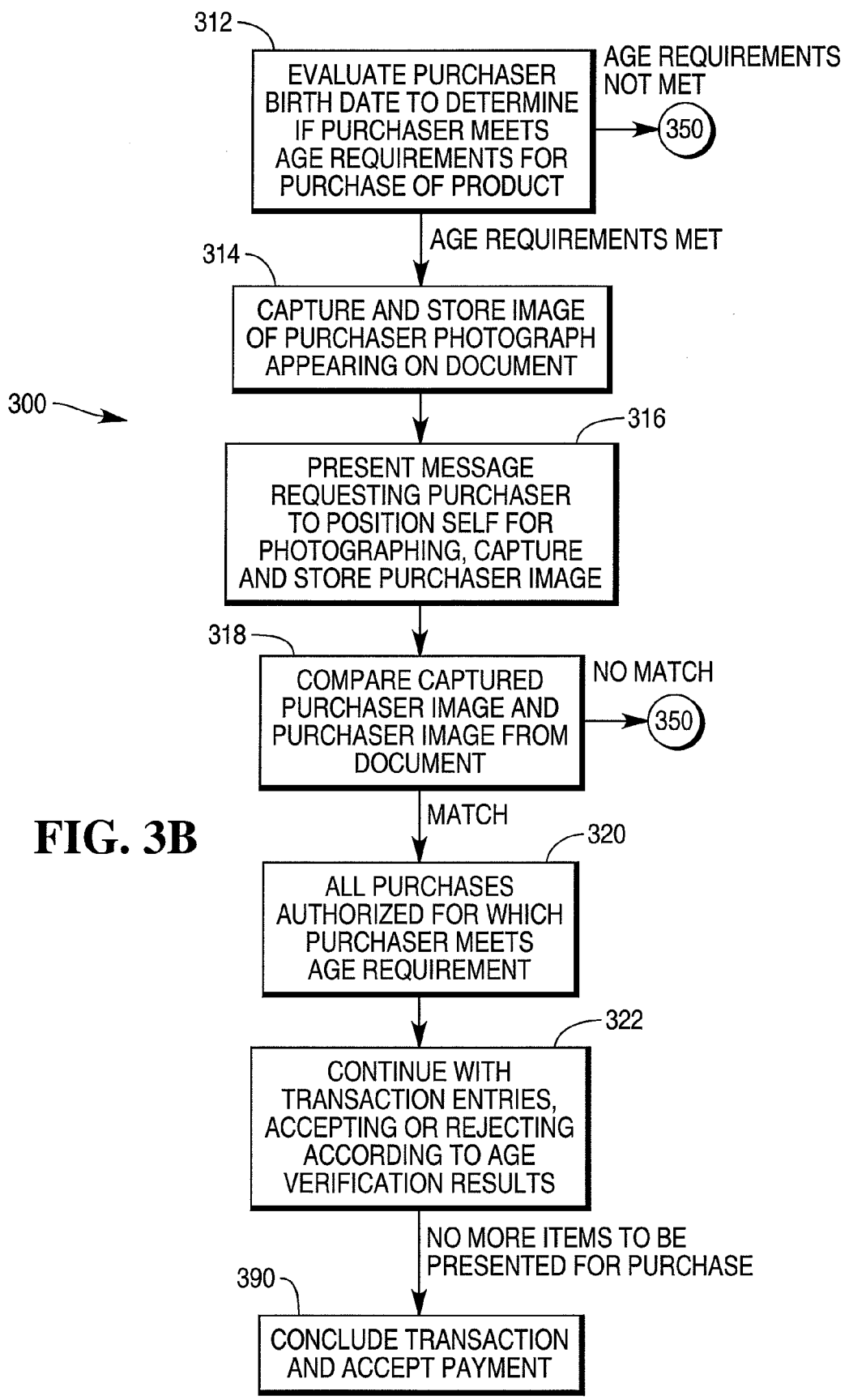
Figure 3C:
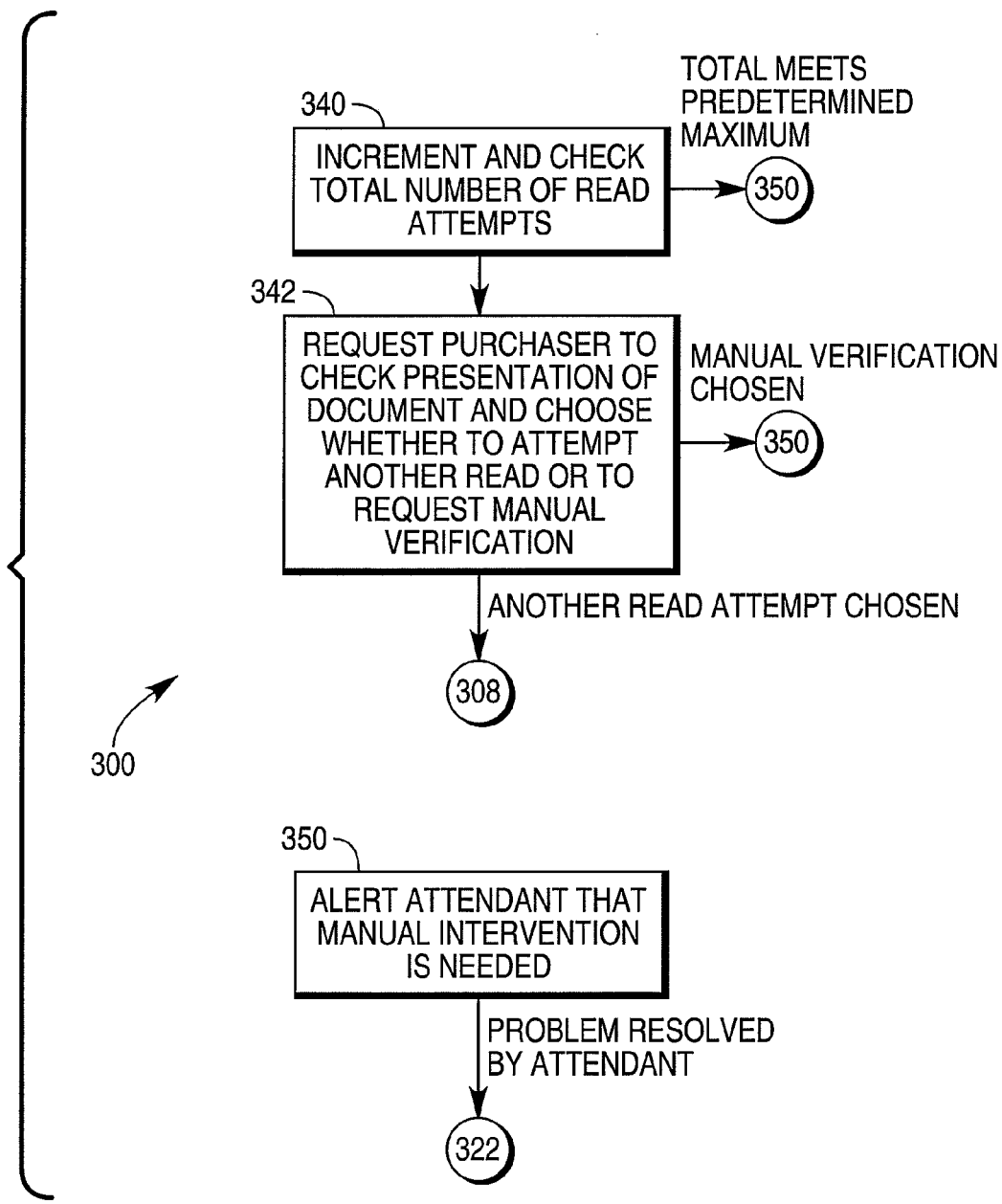

FIGS. 3A-3C illustrate the steps of a process 300 of automatic checkout using automated age verification according to an aspect of the present invention. The process 300 may suitably be performed using a checkout station such as the checkout station 100 of FIG. 1. At step 302, upon initiation and during continuation of an automated checkout transaction, items are identified as they are presented for purchase and the identification of each item is examined to determine if the item is an age restricted item. At step 304, upon identification of an item as age restricted, a message is presented to the purchaser notifying the purchaser that the item is age restricted and requesting that the purchaser present a document suitable for verifying age, along with options for the purchaser to choose to forego the purchase of the item or to request manual age verification.

If the purchaser chooses to forego the purchase, the process proceeds to step 305, the transaction entry for the product is removed from the transaction and the process returns to step 302. If the purchaser chooses to request manual age verification, the process skips to step 350. If the purchaser does not choose to forego the purchase or to request manual verification, the process proceeds to optional step 306 and the user is presented with an opportunity to select the document type to be presented, such as a driver's license from the state in which the transaction is being made, a driver's license from another state, or another document type. The process then proceeds to step 307 and a merchant preference table is consulted for use in guiding reading and processing of document information. At step 308, upon presentation of a document, an attempt is made to read the document. If the user selected a document type at step 306, the attempt may be made to read the selected document type. If the attempt fails, or if the user did not select a document type at step 306, the attempt may be made as if the document is the most common document indicated in the merchant preference table. If that attempt fails, an attempt is made to read the document as the next most common document, and so on, until reading has been attempted for all document formats stored in the merchant preference table. If all such attempts fail, a comprehensive effort is made to read all encoded indicia appearing on the document. If all attempts of any kind to read the document fail, the process skips to step 340, illustrated in FIG. 3C. At step 340, a total number of read attempts is incremented and checked. If the total number of read attempts meets a predetermined maximum, the process skips to step 350, illustrated in FIG. 3C and discussed below. If the total number of read attempts is below a predetermined maximum, the process proceeds to step 342 and the purchaser is requested to check his or her presentation of the document and to choose to request another read attempt or to request manual verification. If the purchaser chooses to request manual verification, the process skips to step 350. If the purchaser chooses another read attempt, the process returns to step 308.

Returning now to step 308, if the document has been successfully read, the process proceeds to step 309 and all encoded information read from the document is stored. Elements of encoded information stored in different formats are stored in separate information elements. At step 310, various elements of encoded information are compared to identify discrepancies. If discrepancies are found, the process skips to step 350. If no discrepancies are found, the process proceeds to step 312, illustrated in FIG. 3B, and the purchaser birth date appearing on the document is evaluated to determine of the purchaser meets the age requirements for the purchase. If the purchaser birth date indicates that the purchaser does not meet the age requirements, the process skips to step 350. If the purchaser birth date indicates that the purchaser meets the age requirements, the process proceeds to step 314 and an image of a purchaser photograph appearing on the document is captured and stored.

At step 316, a message is presented to the purchaser requesting that the purchaser position himself or herself for photographing and an image of the purchaser is captured. At step 318, the captured purchaser image and the purchaser image captured from the purchaser photograph appearing on the document are compared using facial recognition techniques. If the images do not appear to match, the process skips to step 350. If the images match, the process proceeds to step 320 and purchase is authorized for all products for which the purchaser meets the age requirements. Preferably, authorization applies to all items that have been presented or will be presented in the transaction. For example, if the purchaser is 21 years old and has presented a package of cigarettes, purchase of the cigarettes is authorized. In addition, if the purchaser later presents alcohol products in the same transaction, purchase of the alcohol products is authorized without a further need for age verification. The process then proceeds to step 322, with transactions being accepted or rejected according to the results of a previously performed age verification attempt. Once the purchaser indicates that no more items are to be presented for purchase, the process proceeds to step 390 and the transaction is settled. Settlement may be accomplished, for example, by presenting an itemized list of purchases, with a total due, to the purchaser and receiving and verifying payment from the purchaser.

If the process has skipped to step 350 at any point, an attendant is alerted that manual intervention is needed. The alert may come in the form of a suitable message presented on an attendant console, sounding of an audible alert, paging of an attendant through a mobile pager, or any number of alternative means of notification. The message or alert may suitably indicate the nature of the problem requiring intervention. For example, a message may be presented indicating a customer request for manual verification, a mismatch between various elements of the identification document, a mismatch between the document photograph and the customer image, or some other problem or discrepancy. Upon resolution of the problem by the attendant, the process returns to step 322 and the transaction continues. Resolution may include, for example, verification of the purchaser's age, allowing authorization according to the verified age. If appropriate, resolution may include an indication that the purchaser's age cannot be verified, so that the purchaser is prevented from purchasing age restricted products.

While the present invention is disclosed in the context of a presently preferred embodiment, it will be recognized that a wide variety of implementations may be employed by persons of ordinary skill in the art consistent with the above discussion and the claims which follow below.

I claim:

1. An automated customer self checkout station performing automated purchaser age verification for age restricted products, comprising:
 a scanner operative to identify a first item presented to the self checkout station for purchase by the purchaser;
 a document reader operative to read encoded information from a government issued identification document presented by the purchaser where the encoded information includes birth date information and a photograph of the document holder;
 an image capture device operative to capture an image of the purchaser; and
 a processor operative to determine the first item is an age restricted product and to process encoded information to examine the birth date information for the purchaser obtained from the government issued identification document to determine if the purchaser meets age requirements for purchasing the age restricted product, the processor being further operative cause the image capture device to capture an image of the purchaser and to compare the photograph of the document holder with the image of the purchaser and to authorize the purchase of the age restricted product if the age requirements are met and the photograph and image match.

2. The station of claim 1, wherein the processor is operative to direct the alerting of an attendant if automated authorization is not possible.

3. The station of claim 2, wherein the document reader includes a plurality of different encoded information reading devices and wherein the processor is operative to use previously defined document format information defining formatting of documents likely to be presented in controlling selection of the encoded information reading devices to be used.

4. The station of claim 3, further comprising a user interface operative to present a query to the purchaser asking the purchaser to identify a document type to which the presented document belongs and, if the purchaser identifies the document, using document format information for the identified document type in controlling selection of the encoded information reading devices to be used.

5. The station of claim 4, wherein the processor has access to stored document format information for each of a plurality of document types and wherein the processor is able to compare formatting of encoded information obtained from the document against stored document format information in order to identify the document as belonging to a particular document type.

6. The station of claim 5, wherein the processor directs alerting of an attendant upon a determination that the birth date of the purchaser does not meet the requirements for purchase of the item presented, upon determination that the purchaser photograph obtained from the document does not match the captured image of the purchaser, or upon failure to authenticate the document.

7. The station of claim 1, further comprising a remote interface for accessing remotely stored document authentication information, and wherein the processor compares authentication features appearing on the document with stored authentication information in evaluating the authenticity of the document.

8. The station of claim 1, wherein the processor retrieves and examines product information as products are presented for purchase and wherein the processor performs age verification upon identification of a presented product as age restricted.

9. The station of claim 8, wherein the processor performs age verification once during a transaction and authorizes or rejects purchase of products presented subsequent to age verification based on the previously authenticated age of the purchaser.

10. The station of claim 1, wherein the processor is further operable to accept payment for the purchase.

11. A computer implemented method of automated purchaser checkout transaction processing performed by a self checkout station, the method comprising the steps of:

upon identification of a product presented to the self checkout station for purchase as age restricted, requesting presentation of a government issued identification document from the purchaser;

reading encoded identification information from the document where the encoded information includes date of birth;

capturing a purchaser photograph appearing on the document;

capturing an image of the purchaser;

examining the encoded information to determine a birth date of the purchaser;

evaluating the birth date, captured purchaser photograph appearing on the document, and captured purchaser image; and authorizing the purchase if the birth date indicates that the purchaser meets the age requirements for purchase of the presented product and if the captured purchaser image appearing on the document matches the captured image of the purchaser.

12. The method of claim 11, wherein the step of reading the document is preceded by a step of requesting identification from the purchaser of a document type to which the document belongs and wherein the step of reading encoded information from the document includes using known formatting information relating to the document type to which the document belongs in interpreting the encoded information.

13. The method of claim 12, further comprising a step of alerting an attendant if it does not appear that the birth date indicates that the purchaser meets the age requirements for purchaser or if the purchaser image appearing on the document does not match the captured image of the purchaser.

14. The method of claim 13, wherein the step of reading the encoded information is followed by a step of evaluating the encoded information and comparing the encoded information with stored authentication information to determine if the document appears to be authentic and alerting an attendant if the document cannot be confirmed as authentic.

15. The method of claim 14, further comprising a step of comparing corresponding elements of information encoded in different formats on the document and alerting an attendant if corresponding elements do not match.

16. The method of claim 11, wherein the step of authorizing a purchase is followed by a step of identifying products subsequently presented for purchase in the transaction and authorizing or rejecting purchase of the presented products based on results of previous age verification attempts.

17. The method of claim 11, further including the step of accepting payment for the purchase.

\* \* \* \* \*